US011983661B2

(12) United States Patent
Chengalvala

(10) Patent No.: US 11,983,661 B2
(45) Date of Patent: May 14, 2024

(54) DEVICE AUTHENTICATION AND TRUST IN MULTI-MODAL GOODS DELIVERY

(71) Applicant: Ford Global Technologies, LLC, Dearborn, MI (US)

(72) Inventor: Venkata Maruthe Ravikumara Sharma Chengalvala, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2 days.

(21) Appl. No.: 17/556,304

(22) Filed: Dec. 20, 2021

(65) Prior Publication Data

US 2023/0196258 A1 Jun. 22, 2023

(51) Int. Cl.
*G06Q 10/083* (2024.01)
(52) U.S. Cl.
CPC ................... *G06Q 10/083* (2013.01)
(58) Field of Classification Search
CPC ...................................................... G06Q 10/083
See application file for complete search history.

(56) References Cited

U.S. PATENT DOCUMENTS

| 10,621,543 | B2 | 4/2020 | Gupte |
| 10,880,293 | B2 | 12/2020 | Kim et al. |
| 2016/0364989 | A1* | 12/2016 | Speasl .................. G08G 5/0082 |
| 2018/0006829 | A1* | 1/2018 | Kravitz ................. H04W 12/06 |
| 2019/0025818 | A1* | 1/2019 | Mattingly ............ H04L 9/3297 |
| 2019/0199534 | A1* | 6/2019 | Beaman ................ H04L 9/3247 |
| 2019/0319808 | A1* | 10/2019 | Fallah ................... H04L 9/3239 |
| 2021/0241228 | A1* | 8/2021 | Tazume ................ B65G 61/00 |

FOREIGN PATENT DOCUMENTS

| CN | 203241824 U | 10/2013 |
| CN | 107006044 B | 8/2017 |

OTHER PUBLICATIONS

Dayarian, Iman et al., "Same-Day Delivery with Drone Resupply," 2020, optimization-online.org. (Year: 2020).*
Transportation 4.0: Multimodal Transportation Systems.

* cited by examiner

*Primary Examiner* — Daniel Vetter
*Assistant Examiner* — Christopher Gomez
(74) *Attorney, Agent, or Firm* — Brandon Hicks; Eversheds Sutherland (US) LLP

(57) ABSTRACT

A method for authenticating payload delivery devices. The payload delivery devices can include autonomous robotic delivery vehicles or other devices. The disclosed method causes delivery devices to authenticate each other during the delivery cycle via the cloud by determining, via a processor, payload delivery mission metadata that can include a mission identification (ID), payload information, and a mission type associated with payload delivery. The method further includes generating, based on the payload delivery mission metadata, a multi-modal authentication message that, when received by a first delivery device, configures the first delivery device to authenticate a second delivery device using a token generated onboard the delivery device or received from the cloud server, receive and authenticate delivery payload associated with the payload delivery mission, and complete a delivery operation through cloud server-coordinated or independent device authentication.

11 Claims, 8 Drawing Sheets

DEVICE AUTHENTICATION AND TRUST IN MULTI-MODAL GOODS DELIVERY

BACKGROUND

Delivery robots move payload from an origination point through various points along a delivery infrastructure to a target delivery destination. Autonomous and semi-autonomous vehicles and robotics are increasingly common in package delivery ecosystems. Multi-modal delivery and transportation systems may include various forms of devices and vehicles that perform delivery steps along the delivery pathway. The delivery drone may interact with a human actor or finish delivery to a final destination. The various modes of delivery can include autonomous and semi-autonomous transport vehicles, which may be ground-based, air-based, or maritime vehicles. Multi-modal delivery and transport can also include human actors that interact with the vehicles along the delivery pathway. In multi-mode delivery, multiple devices and vehicles may coordinate together to route packages from point of origin to destination. In a multi-modal package delivery system, a bipedal or other type of loading robot may be directed to place packages on a delivery vehicle, an unloading robot may offload the packages at a waypoint or distribution center, and transfer the packages to a delivery drone. The delivery drone may route the packages to the target destination as part of the last-mile delivery.

Multi-modal delivery ecosystems may increase security with authentication of vehicles, devices, and delivery payload in the delivery chain. Although some conventional systems may include device-to-device authentication to identify delivery devices and/or transported payload as trusted and known, they may not operate on a common framework for authentication functions, especially when aspects of the delivery chain are performed by different companies or have human actors integrated with the delivery chain. Without a common authentication framework, conventional multi-modal delivery systems may be vulnerable to a device-in-the-middle attack.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
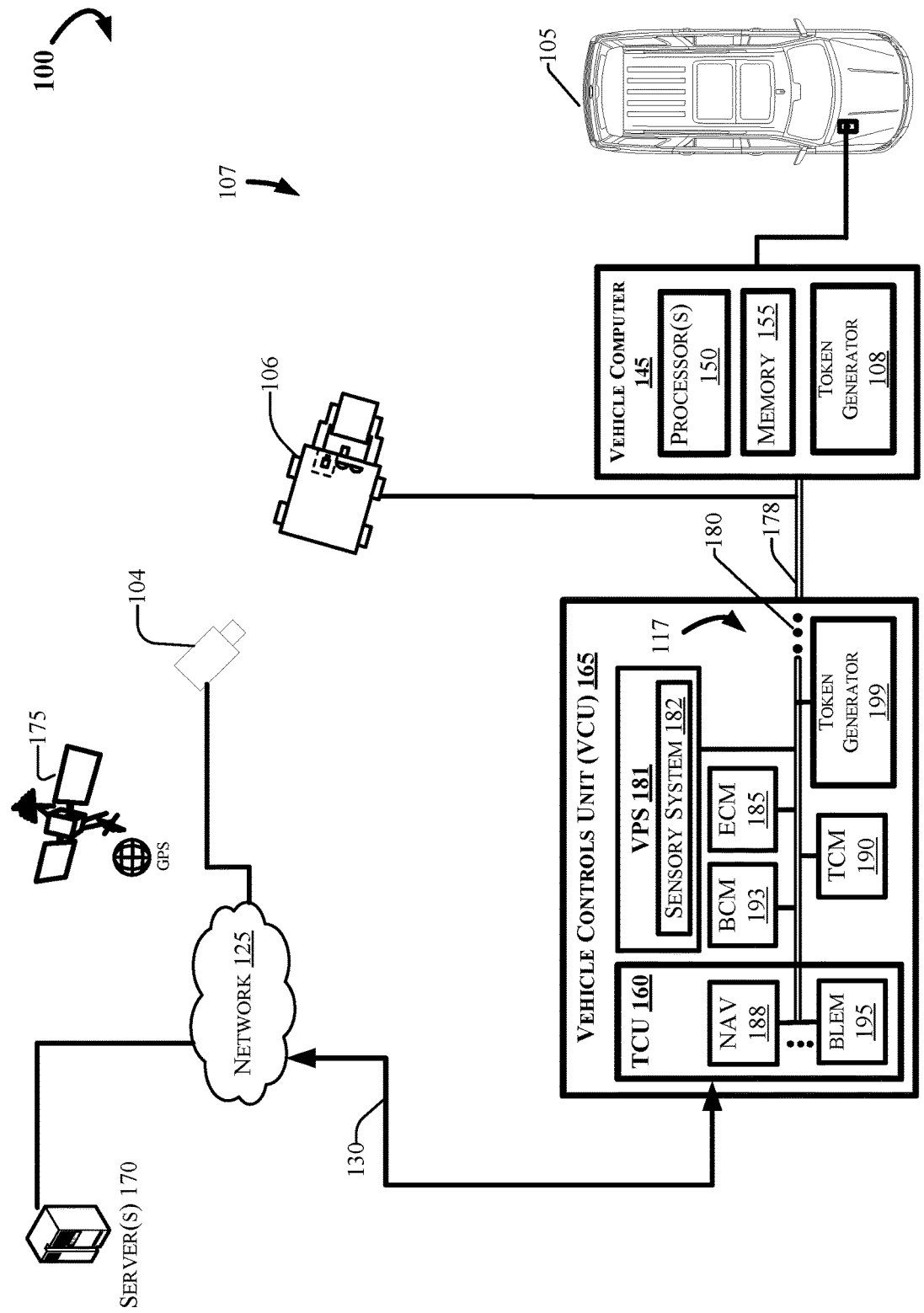
FIG. 1 depicts an example computing environment in which techniques and structures for providing the systems and methods disclosed herein may be implemented.

The systems and methods disclosed herein are configured and/or programmed for device authentication and trust in multi-modal goods delivery. The systems and methods provide a unique authentication framework for establishing trust between the devices. Aspects of the present disclosure mitigate or resolve security threats that can include Device In the Middle (Similar to Man in the Middle Attacks) attacks, and the like.

Package delivery from a point of origin to a target destination via a multi-modal delivery system is referred to as a delivery mission. A delivery mission may include coordinating a plurality of devices that can include autonomous robotics, vehicles, aircraft, and other devices that may perform aspects of package handling, transportation, and package delivery. The delivery devices may operate autonomously, semi-autonomously, and interface with human actors.

According to one or more embodiments, a multi-modal authentication and delivery system (hereafter "multi-modal authentication system") can generate data packets that are shared and authenticated by devices along the delivery pathway that provide delivery mission information, device identity information, and payload information. The multi-modal authentication system may generate and/or utilize unique metadata associated with aspects of the payload delivered, assigned delivery devices, modes, vehicles, and other information. In some aspects, the system may store device information that can include a unique device identification (ID), a model number, and/or one or more image(s) of the device. The system may further include generating and/or providing a replica of the device data is also stored in the devices. All the devices participating in a mission are pre-identified and mapped and unique tokens may be statically or dynamically generated to identify them. These pre-identified data maps are stored in the devices participating in a segment. As an example, if Device B receives a package from Device-A and delivers to Device-C, Device B will have identification maps for A and C for that mission. After the mission is completed, the identifiers may change for a different mission. Each device can have an authenticator, store meta data copy, an authentication/trust map, and can optionally add a token generator. With this mechanism each device can identify the other device participating in a mission and authenticate them. This model may be extended to include an optional device monitoring module to audit everything is working as intended. Authentication tokens for each device for a mission are pre-generated prior to the mission and sent to the participating devices in a mission. This way each device has the knowledge of the token it is expected to receive from the other in case of multi-modal transport. At the same time each device has knowledge of the token it is expected to send to other device prior to start of a mission.

Device meta information will be available in a central device data store as well as each device's meta information is stored locally in its persistent memory. Meta information also includes an image of the device itself. Some devices may have token generation capability. A token could be a unique identifier with a definite time to live. Time to live may match the duration of a mission and is configurable. Tokens should support additional attributes like the owner of the token (In this case a device), Target Device (Device to which goods are destined to be delivered), Time to Live, and optional customer attributes.

A token could be a global unique identifier. Devices participating in a mission are pre-identified (electronic serial number, device no., model number, manufacturer, image of itself). A device can export and publish its meta information through API's. This helps other devices to uniquely to identify it. Devices in a mission have capability to discover other devices in the same mission and vice-versa. It is possible to include or exclude certain devices from being discoverable based on the business need. Each device may have different capabilities and different protocols. As an example, for device-device communications Bluetooth, Cellular and Wi-Fi are some of the options (Not limited to these). For device-cloud communications: Application layer protocols http(s), Real, MQTT, gRPC etc. may be used. In certain situations, protocols like UDP/TCP may be used as well for direct communication with the cloud instead of Application Layer protocols. Devices have the capability to generate a token, validate a token, authenticate a token using embedded programs in any language like C++, Java or others. It could be as simple as a GUID or a complex custom token or tokens similar to OAuth2.

These and other advantages of the present disclosure are provided in greater detail herein.

Illustrative Embodiments

The disclosure will be described more fully hereinafter with reference to the accompanying drawings, in which example embodiments of the disclosure are shown, and not intended to be limiting.

Figure 2:
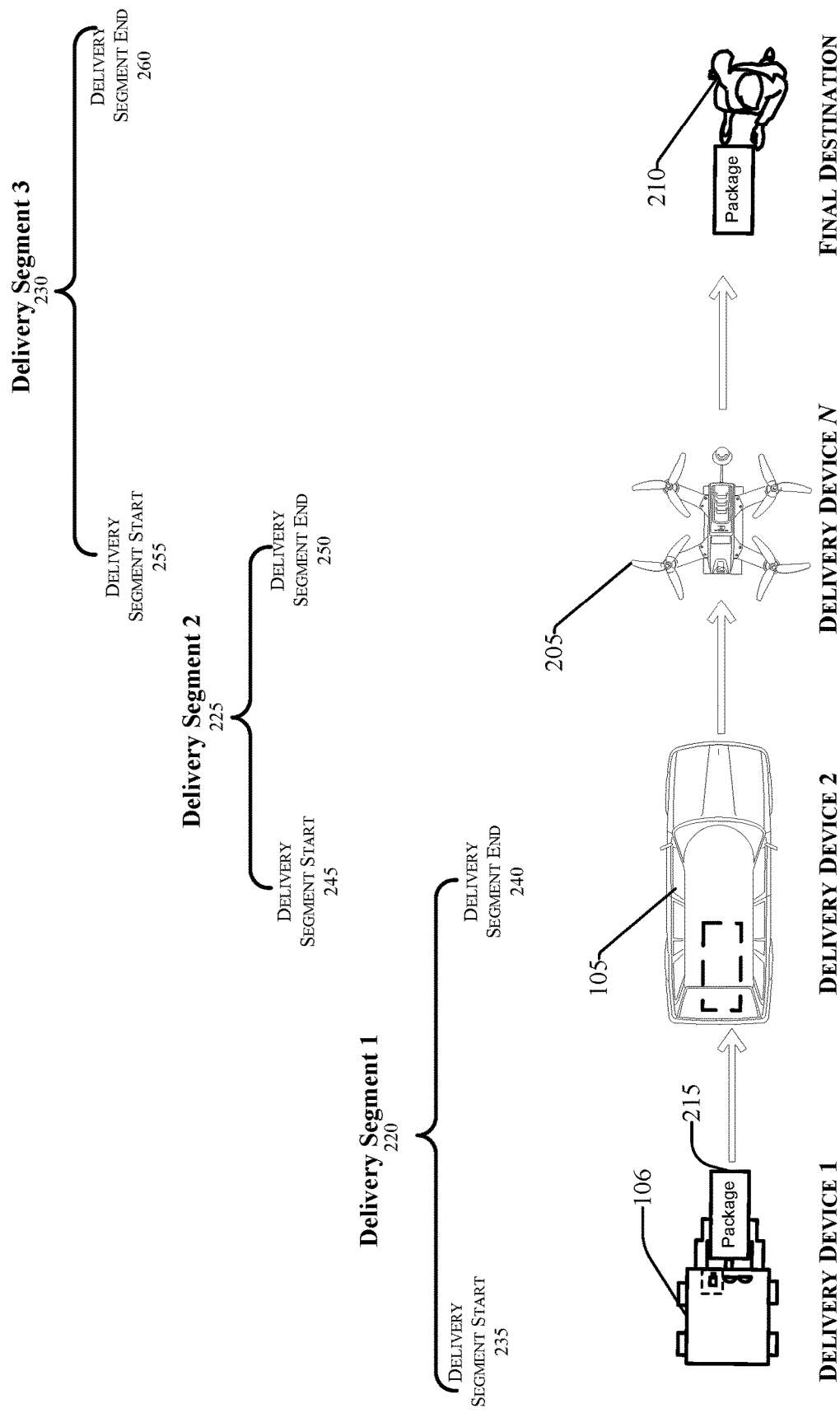
FIG. 2 depicts a plurality of delivery devices coordinated to complete a delivery mission in accordance with the present disclosure.

FIG. 1 depicts an example delivery and computing environment 100 that can include an delivery device 105, and a delivery robot 206 (as shown in FIG. 2), etc., an autonomous aerial vehicle (e.g., a drone) 205, etc. Self-driving delivery platforms may curb the high cost of last-mile and last 100-meter delivery of goods. Disclosed embodiments describe robot navigation and package delivery in dynamically changing urban or other environments. The delivery device 106 may be disposed in communication with the delivery device 105, and other devices connected via the network(s) 125. The delivery device 106, described in greater detail with respect to FIGS. 2, 3, and 4, can include a combination of infrared (IR) cameras, LiDAR, and ultrasonic sensors configured and/or programmed to facilitate autonomous operation. The delivery device 106 may utilize semantic segmentation on IR image streams to map semantics from a Red-Green-Blue (RGB) color image to a heat signature image obtained from IR sensor(s) onboard the delivery device 105. The delivery device 106 may be configurable to include any robotic chassis, such as bipedal robot, a 4-legged robot, a wheeled robot (shown in FIG. 1), etc. The delivery device 106 may further include robotic arms for loading, unloading, and performing other delivery tasks.

The delivery device 105 may include an vehicle computer 145, and a Vehicle Controls Unit (VCU) 165 that can include a plurality of electronic control units (ECUs) 117 disposed in communication with the vehicle computer 145. The delivery device 105 may connect with the vehicle computer 145 using wired and/or wireless communication protocols and transceivers. The one or more network(s) 125 may communicate via one or more wireless connection(s) 130, and/or may connect with the delivery device 105 directly using near field communication (NFC) protocols, Bluetooth® protocols, Wi-Fi, Ultra-Wide Band (UWB), and other possible data connection and sharing techniques.

The delivery device 105 may also receive and/or be in communication with a Global Positioning System (GPS) 175. The GPS 175 may be a satellite system (as depicted in FIG. 1) such as the global navigation satellite system (GLNSS), Galileo, or navigation or other similar system. In other aspects, the GPS 175 may be a terrestrial-based navigation network. In some embodiments, the delivery device 105 may utilize a combination of GPS and Dead Reckoning responsive to determining that a threshold number of satellites are not recognized.

The vehicle computer 145 may be or include an electronic vehicle controller, having one or more processor(s) 150 and memory 155. The vehicle computer 145 may, in some example embodiments, be disposed in communication with one or more server(s) 170. The server(s) 170 may be part of a cloud-based computing infrastructure, and may be associated with and/or include a Telematics Service Delivery Network (SDN) that provides digital data services to the delivery device 105 and other vehicles (not shown in FIG. 1) that may be part of a vehicle fleet.

Although illustrated as a sport utility, the delivery device 105 may take the form of another passenger or commercial automobile such as, for example, a car, a truck, a crossover vehicle, a van, a minivan, a taxi, a bus, etc., and may be configured and/or programmed to include various types of automotive drive systems. Example drive systems can include various types of internal combustion engines (ICEs) powertrains having a gasoline, diesel, or natural gas-powered combustion engine with conventional drive components such as, a transmission, a drive shaft, a differential, etc. In another configuration, the delivery device 105 may be configured as an electric vehicle (EV). More particularly, the delivery device 105 may include a battery EV (BEV) drive system, or be configured as a hybrid EV (HEV) having an independent onboard power source, a plug-in REV (PHEV) that includes a REV powertrain connectable to an external power source, and/or includes a parallel or series hybrid powertrain having a combustion engine power source and one or more EV drive systems. HEVs may further include battery and/or supercapacitor banks for power storage, flywheel power storage systems, or other power generation and storage infrastructure. The delivery device 105 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the delivery device 105 may be programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4.

A vehicle having a Level-0 autonomous automation may not include autonomous driving features.

A vehicle having Level-1 autonomy may include a single automated driver assistance feature, such as steering or acceleration assistance. Adaptive cruise control is one such example of a Level-1 autonomous system that includes aspects of both acceleration and steering.

Level-2 autonomy in vehicles may provide driver assist technologies such as partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation.

Level-3 autonomy in a vehicle can provide conditional automation and control of driving features. For example, Level-3 vehicle autonomy may include "environmental detection" capabilities, where the autonomous vehicle (AV) can make informed decisions independently from a present driver, such as accelerating past a slow-moving vehicle, while the present driver remains ready to retake control of the vehicle if the system is unable to execute the task.

Level-4 AVs can operate independently from a human driver, but may still include human controls for override operation. Level-4 automation may also enable a self-driving mode to intervene responsive to a predefined conditional trigger, such as a road hazard or a system event.

Level-5 AVs may include fully autonomous vehicle systems that require no human input for operation, and may not include human operational driving controls.

According to embodiments of the present disclosure, the multi-modal authentication system 107 may be configured and/or programmed to operate with vehicles having Level-4 or Level-5 autonomous vehicle controllers. Accordingly, the multi-modal authentication system 107 may provide some aspects of human control to the delivery device 105, when the vehicle is configured as an AV.

The network(s) 125 illustrate an example communication infrastructure in which the connected devices discussed in various embodiments of this disclosure may communicate. The network(s) 125 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The network(s) 125 may be disposed in communication with one or more infrastructure sensor devices 104 that may be installed in the delivery environment 100. The vehicle computer 145 may be installed in an engine compartment of the delivery device 105 (or elsewhere in the delivery device 105) and operate as a functional part of the multi-modal authentication system 107, in accordance with the disclosure. The vehicle computer 145 may include one or more processor(s) 150 and a computer-readable memory 155. The vehicle computer 145 may further include and/or operate with an AV controller 108, which may provide autonomous driving features.

The one or more processor(s) 150 may be disposed in communication with one or more memory devices disposed in communication with the respective computing systems (e.g., the memory 155 and/or one or more external databases not shown in FIG. 1). The processor(s) 150 may utilize the memory 155 to store programs in code and/or to store data for performing aspects in accordance with the disclosure. The memory 155 may be a non-transitory computer-readable memory storing a robotic delivery program code. The memory 155 can include any one or a combination of volatile memory elements (e.g., dynamic random access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The VCU 165 may share a wired or wireless communication bus 178 with the vehicle computer 145, and may be configured and/or programmed to coordinate the data between delivery device 105 systems, connected servers (e.g., the server(s) 170), and other vehicles (not shown in FIG. 1) operating as part of a vehicle fleet. Although multiple robotic delivery vehicles may be coordinated to work cooperatively for a package delivery operation, it should be appreciated that the delivery vehicles may or may not be part of the same fleet. For example, one or more vehicles may be operated and/or affiliated with one business entity, while one or more of the delivery vehicles may be operated and/or affiliated with a second business entity. Although a single VCU 165 and vehicle computer 145 is depicted in FIG. 1, the computing infrastructure is intended to be representative of respective computing architectures present in any one or more of the delivery devices discussed herein.

The VCU 165 can include or communicate with any combination of the ECUs 117, such as, for example, a Body Control Module (BCM) 193, an Engine Control Module (ECM) 185, a Transmission Control Module (TCM) 190, the TCU 160, a token generator 199, etc. The VCU 165 may further include and/or communicate with a Vehicle Perception System (VPS) 181, having connectivity with and/or control of one or more vehicle sensory system(s) 182. In some aspects, the VCU 165 may control operational aspects of the delivery device 105, and implement one or more instruction sets stored in computer memory 155 of the vehicle computer 145, including instructions operational as part of the multi-modal authentication system 107.

The TCU 160 can be configured and/or programmed to provide vehicle connectivity to wireless computing systems onboard and offboard the delivery device 105, and may include a Navigation (NAV) receiver 188 for receiving and processing a GPS signal from the GPS 175, a BLE® Module (BLEM) 195, a Wi-Fi transceiver, a UWB transceiver, and/or other wireless transceivers (not shown in FIG. 1) that may be configurable for wireless communication between the delivery device 105 and other systems, computers, and modules. The TCU 160 may be disposed in communication with the ECUs 117 by way of a bus 180. In some aspects, the TCU 160 may retrieve data and send data as a node in a CAN bus.

The BLEM 195 may establish wireless communication using Bluetooth® and BLE® communication protocols by broadcasting and/or listening for broadcasts of small advertising packets, and establishing connections with responsive devices that are configured according to embodiments described herein. For example, the BLEM 195 may include Generic Attribute Profile (GATT) device connectivity for client devices that respond to or initiate GATT commands and requests, and connect directly with one or more keys. In one aspect the delivery device 106 may communicate with the second delivery device 105 via the BLEM 195 and/or via another wireless communication device via the network 125. The delivery devices 105, 106, etc., may communicate using inter-device token exchange, and may leverage short range device-to-device (D2D) communication protocols such as, for example, like Bluetooth®, and/or Wi-Fi and Cellular communications.

In some aspects, the ECUs 117 may communicate with a host computer (e.g., the vehicle computer 145, the multi-modal authentication system 107, and/or the server(s) 170, etc.), and may also communicate with one another without the necessity of a host computer. The bus 180 may connect the ECUs 117 with the vehicle computer 145 such that the vehicle computer 145 may retrieve information from, send information to, and otherwise interact with the ECUs 117 to perform steps described according to embodiments of the present disclosure. The bus 180 may connect CAN bus nodes (e.g., the ECUs 117) to each other through a two-wire bus, which may be a twisted pair having a nominal characteristic impedance. The bus 180 may also be accomplished using other communication protocol solutions, such as Media Oriented Systems Transport (MOST) or Ethernet. In other aspects, the bus 180 may be a wireless intra-vehicle bus.

The VCU 165 may control various loads directly via the bus 180 communication or implement such control in conjunction with the BCM 193. The ECUs 117 described with respect to the VCU 165 are provided for example purposes only, and are not intended to be limiting or exclusive. Control and/or communication with other control modules not shown in FIG. 1 is possible, and such control is contemplated.

In an example embodiment, the ECUs 117 may control aspects of vehicle operation and communication using inputs from an autonomous vehicle controller (not shown in FIG. 1), the multi-modal authentication system 107, and/or via wireless signal inputs received via the wireless connection(s) 133 from other connected devices. The ECUs 117, when configured as nodes in the bus 180, may each include a central processing unit (CPU), a CAN controller, and/or a transceiver (not shown in FIG. 1).

The BCM 193 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 193 may also operate as a gateway for bus and network interfaces to interact with remote ECUs (not shown in FIG. 1).

The BCM 193 may coordinate any one or more functions from a wide range of vehicle functionality, including energy management systems, alarms, vehicle immobilizers, etc. The BCM 193 may be configured for vehicle energy management, exterior lighting control, wiper functionality, and other vehicle systems. In other aspects, the BCM 193 may control auxiliary equipment functionality, and/or be responsible for integration of such functionality.

In other aspects, the Vehicle Perception System (VPS) 181 may include internal and external sensory systems (collectively referred to as sensory systems 182).

The computing system architecture of the vehicle computer 145, VCU 165, and/or the multi-modal authentication system 107 may omit certain computing modules. It should be readily understood that the computing environment depicted in FIG. 1 is an example of one possible implementation according to the present disclosure, and thus, it should not be considered limiting or exclusive.

FIG. 2 depicts a plurality of delivery devices coordinated to complete a delivery mission in accordance with the present disclosure. The multi-modal authentication system 107 may be configured and/or programmed for device authentication and trust in multi-modal goods delivery. The systems and methods provide a unique authentication framework for establishing trust between a plurality of delivery devices, such as a vehicle (depicted in FIG. 2 as Delivery Device 2) a delivery device 106 (depicted as Delivery Device 1), an unmanned aerial vehicle (delivery device 205), which may be, for example, a drone delivery device or another autonomous device. The delivery devices 105, 106, 205, etc. may move cargo (e.g., the package 215 as shown in FIG. 2) during a delivery mission along a package delivery route in segments. A delivery mission may include coordinating a plurality of devices that can include autonomous robotics, vehicles, aircraft, and other devices that may perform aspects of package handling, transportation, and package delivery. The delivery devices may operate autonomously, semi-autonomously, and interface with human actors such as a cargo recipient 210.

FIG. 2 illustrates 3 delivery segments that include delivery segment 1 220 having a delivery segment start 235 at the cargo origin, and a delivery segment end 240, where the delivery device 1 106 transfers the cargo 215 to the delivery device 2 105. Package delivery from a point of origin to a target destination via a multi-modal delivery system is referred to as a delivery mission.

The delivery segments 220, 225, and 230 shown in FIG. 2 further include a delivery segment 2 225, where the delivery device 2 receives the cargo 210 from the first delivery device 106, and transports the cargo 215 to a waypoint (the delivery segment end 250), and delivery segment 3 230 beginning at the delivery segment start 255 and ending at the delivery segment end 260, which is the final destination for tendering the cargo 215 to the cargo recipient 210.

As a package (e.g., cargo 215) is routed from a point of origin (at the delivery segment start 235) to the final destination, the delivery devices may be vulnerable to bad actors if the delivery devices 105, 106, and 205 were coordinated by conventional delivery management systems. The multi-modal authentication system 107 (illustrated in FIG. 1) may resolve security threats that can include Device in the Middle (Similar to Man in the Middle Attacks) attacks, or other types of security threats associated with poor or no device-to-device authentication as the cargo 215 is routed from the package origin to the final destination.

Figure 3:
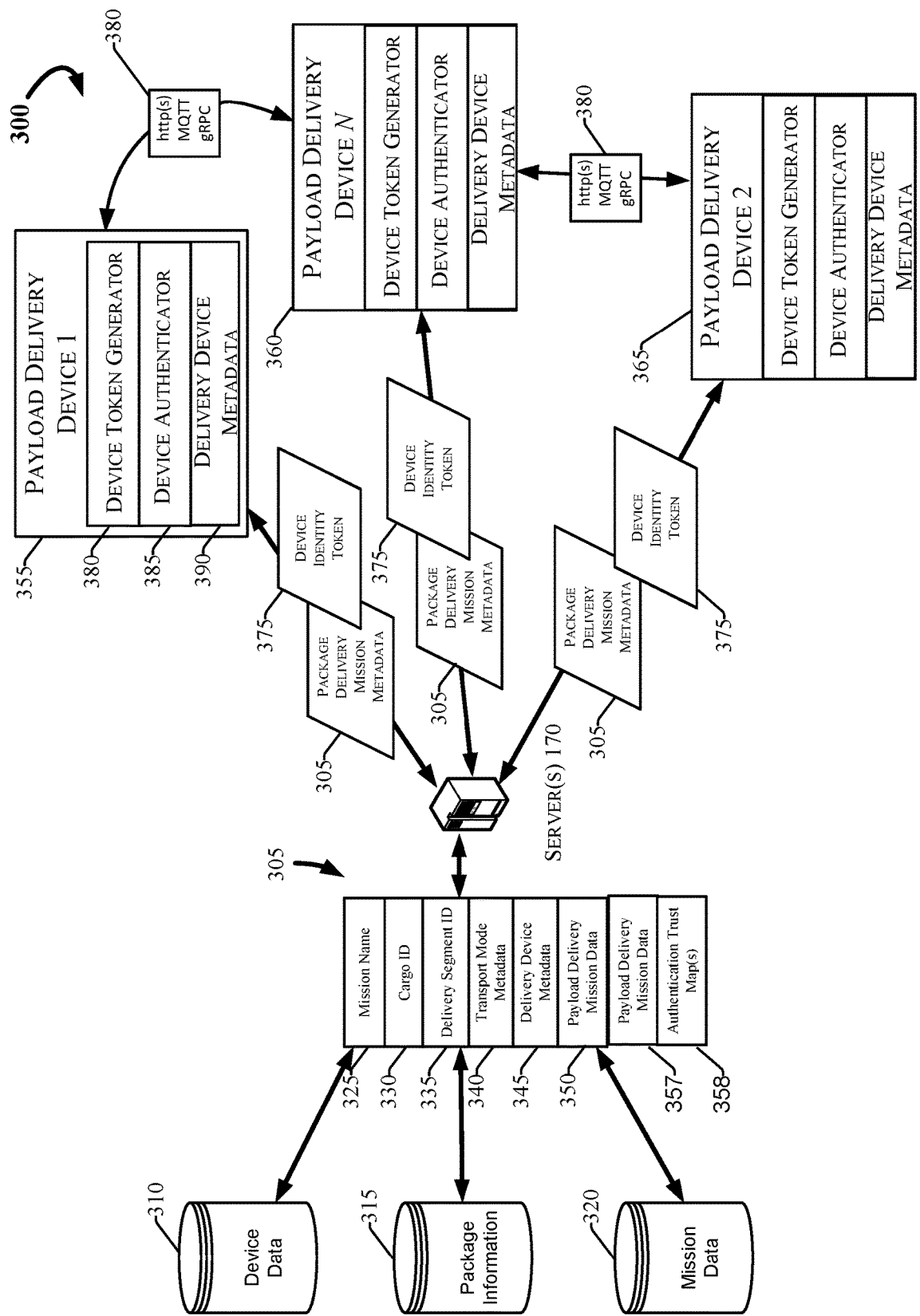
FIG. 3 illustrates an example system architecture for the delivery device authentication system in accordance with the present disclosure.

FIG. 3 illustrates an example system architecture 300 for the multi-modal authentication system 107, in accordance with the present disclosure. As shown in FIG. 3, the server(s) 170 may store and manage a plurality of mission-related information referred to herein as delivery mission metadata 305.

The system architecture 300 may include a device database 310, package information database 315, and a mission data database 320. The multi-modal authentication system 107 can generate data packets that are shared and authenticated by devices along the delivery pathway that provide the delivery mission metadata 305, which may include delivery mission information, device identity information, and payload information, etc. For example, the 305 may optionally include a mission name 325, and may further include a cargo identification (ID) 330, a delivery segment ID 335, a transport mode metadata 340, delivery device metadata 345, and/or payload delivery mission metadata 350. The payload delivery devices shown in FIG. 3 include a payload delivery device 1 355, a payload delivery device 2 365, and a payload delivery device N 360.

According to some embodiments, the multi-modal authentication system 107 may coordinate the payload delivery devices 355, 360, and 365 to perform aspects of the delivery mission, and may generate and/or utilize unique metadata associated with aspects of the payload delivered, which may uniquely define assigned delivery devices 355-365, delivery modes, particular vehicles, human actor information such as identity, biometric identification information, passwords, keys, and other information.

In some aspects, the multi-modal authentication system 107 may store device information that can include a unique device identification (ID) associated with a unique identifier for the delivery devices 355-365, a delivery device model number, and/or one or more image(s) of the device. The multi-modal authentication system 107 may further include a replica of delivery device metadata 390, which may be stored in respective payload delivery devices 355-365, and/or may be stored in the server(s) 170. In some example embodiments, the devices participating in a mission are pre-identified and mapped using unique tokens (e.g., device identity token(s) 275), which may be statically or dynamically generated to identify the delivery devices 355-365. These pre-identified data maps are stored in the delivery devices 355-365 participating in a segment (e.g., one or more of the delivery segments 220-230 (as shown in FIG. 2). As an example, if the second delivery device 105 (as shown in FIG. 2) receives a package from the second delivery device 105, and delivers the cargo 215 to Delivery device-N 205, the second delivery device 105 may include identification maps indicative of delivery information. This information is stored as part of the delivery mission metadata 305. The multi-modal authentication system 107 may store the delivery mission metadata 305 in persistent memory (e.g., the memory 155 as shown in FIG. 1). Responsive to completing a delivery mission, the identifiers may change for a different mission. one or more of the delivery devices 344-365 can include a delivery device authenticator 385, store meta data copy, and/or one or more authentication/trust maps 358, and can optionally add a token generator. With this mechanism each device can identify the other device participating in a mission and authenticate them. This model may be extended to include an optional device monitoring module to audit everything is working as intended.

In one aspect, the multi-modal authentication system 107 may generate authentication tokens (e.g., device identity token(s) 375) for a delivery mission and transmit the device identity token(s) to one or more of the delivery devices 355-365 prior to a delivery mission. By sending the device identity token(s) 375 to participating delivery devices, a respective delivery device may have advanced knowledge of the token it is expected to receive from one or more of the other participating delivery devices. At the same time a respective device has knowledge of the token it is expected to send to other device prior to start of a mission.

The multi-modal authentication system 107 may store the device metadata such that the device metadata (stored and regulated as delivery mission metadata 305) may be made available in a central device data store (e.g., the device database 310) as well as each device's meta information stored locally in the persistent memory (155 as shown in FIG. 1). Meta information may also include an image of a respective device. For example, In some aspects, the image can be used as a multi-factor authentication means for enhanced security and trust between the devices in addition to token. For example, the first delivery device may include one or more onboard copies of the image, and may share it with a second delivery device its own image and can share it with a secondary authentication method that allows the second device to authenticate one or more of the delivery devices associated with the delivery chain in addition to or apart from the token (and vice versa). According to another example, one or more devices in the delivery chain can authenticate other devices through an artificial intelligence (AI)-based image recognition algorithm for enhanced security. In other aspects, the secondary authentication method may include a simple comparison of a color, file size, quality factor, or other feature associated with the cargo.

iii. In case of cloud-based authentication or computing power limitations, images can be validated in the cloud in addition to the tokens.

iv. Helpful in delivery of important and confidential packages as an additional layer of authentication Some devices may have token generation capability onboard the respective device. For example, as shown in FIG. 3, the payload delivery devices 355-365 are depicted as having a as device token generator 380.

In one aspect, a device identity token (e.g., 375) may be or include a unique identifier associated with a payload delivery device. The device identity token 375 may further include having a definite time to live (or an expiration time, date, etc.) such that the token is usable to authenticate a device at a time before the expiration date, time, etc. A time to live may match the expected time duration of a mission, and may be configurable to allow for an extension of time that accounts for shipping or other logistics delays, or a shortened expiration date, time, etc.

In some aspects, the device identity token 375 may support additional attributes that can include identification of a token owner, which may be a device, a person, an entity, a fleet, etc. The token attributes may further include information indicative of a target device (a device to which goods are destined to be tendered for a subsequent delivery segment or a device for authenticating final delivery and tender to the recipient. The token attributes may further include the expiration (e.g., the Time to Live), and may further include one or more optional customer attributes such as customer name, customer address, title, business information, etc.

According to one or more embodiments, the device identity token(s) 375 may include global unique identifier (ID). Devices participating in a mission may be pre-identified (e.g., by a unique electronic serial number, a unique device number, a delivery device model number, a delivery device manufacturer, and/or may include image of the device associated with the device identity token. A device can export and publish its meta information through application programming interface(s) (APIs). The export and publish function may assist other devices to uniquely to identify the token 375 and/or the device associated with the token 375

Devices in a mission may have capability to discover other devices in the same mission and vice-versa. It is possible to include or exclude certain devices from being discoverable based on the business need. Each device may have different capabilities and may be equipped to support different protocols. As an example, for device-device communications, Bluetooth, Cellular and Wi-Fi may be among available communication options (though other protocols and technologies are possible).

For device-cloud communications, the multi-modal authentication system 107 may utilize application layer protocol http(s), The multi-modal authentication system 107 may use Real, MQTT, gRPC 380 etc. In certain situations, protocols like UDP/TCP 380, and other protocols for direct communication with the cloud (e.g., from the delivery devices 355-365 to the server(s) 170) instead of or in addition to Application Layer protocols.

In some aspects, the delivery devices 355-365 may or may not include the capability to generate a token using a respective device token generator 380, validate a token using the device authenticator 385, and may authenticate the device identity token(s) 375 using embedded programs in any language like C++, Java or others. It could be as simple as a GUID or a complex custom token or tokens similar to OAuth2.

Figure 4:
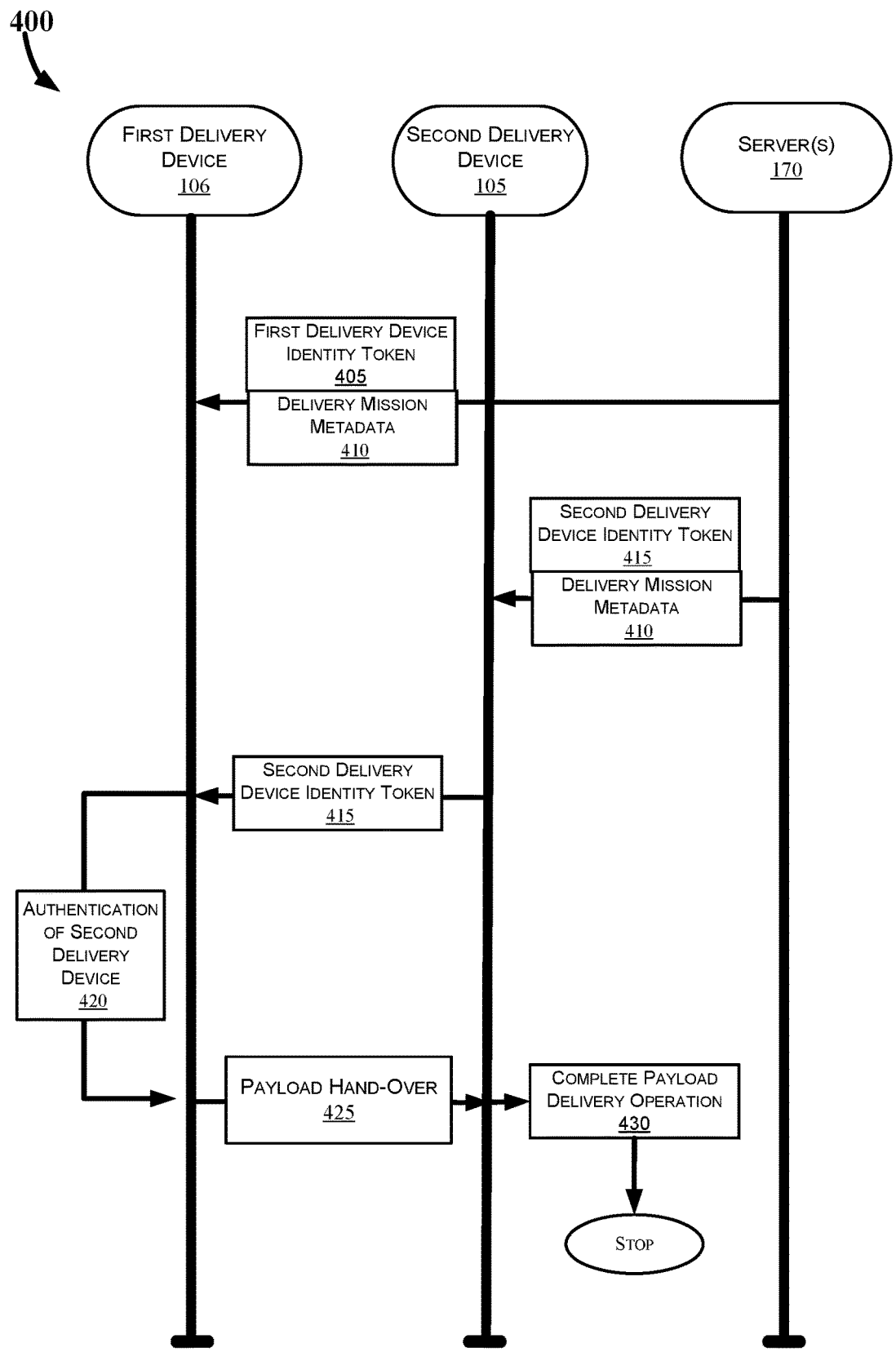
FIG. 4 is a functional flow diagram in accordance with an embodiment of the present disclosure.
Figure 5:
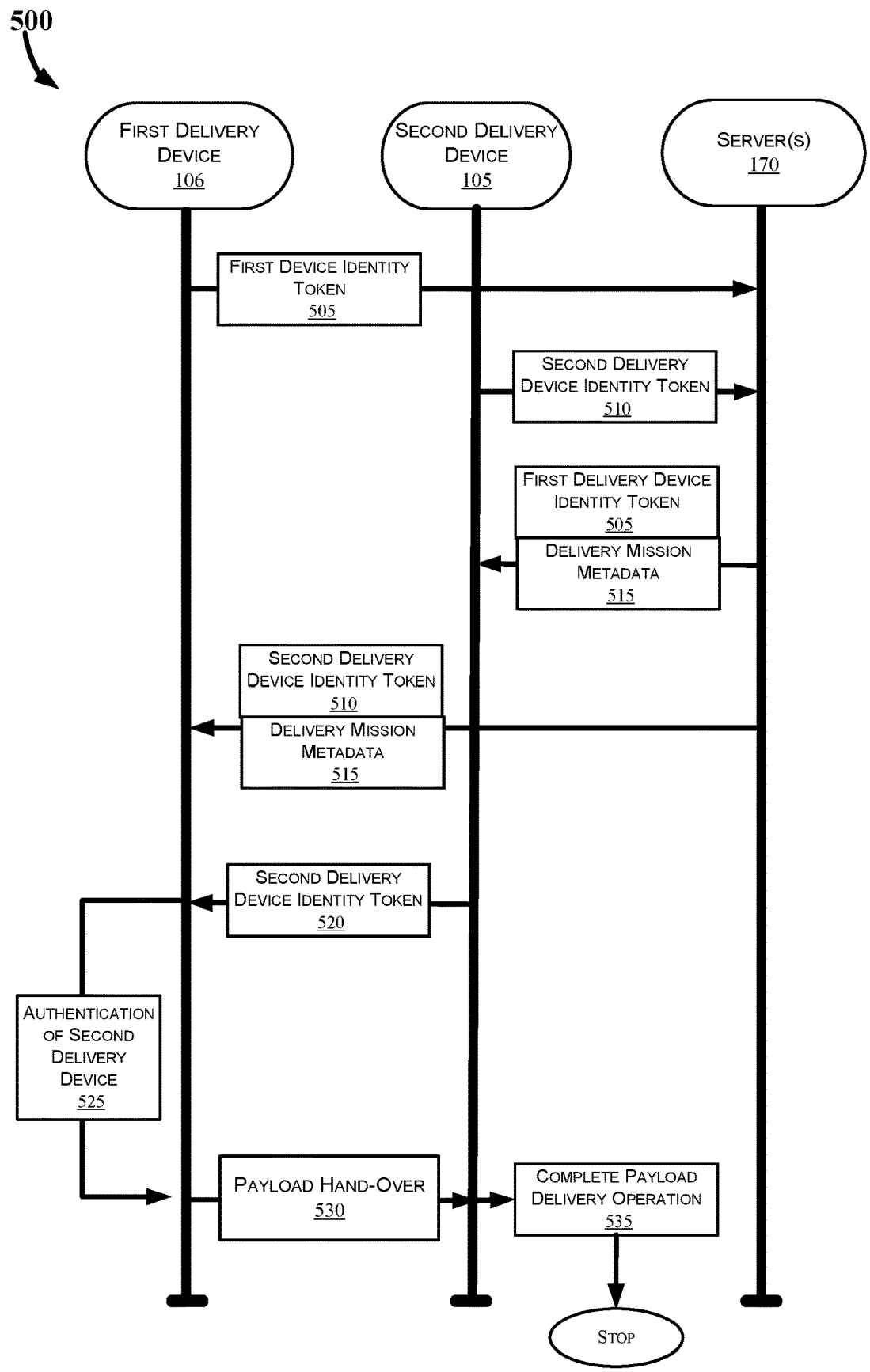
FIG. 5 is another functional flow diagram in accordance with an embodiment of the present disclosure.
Figure 6:
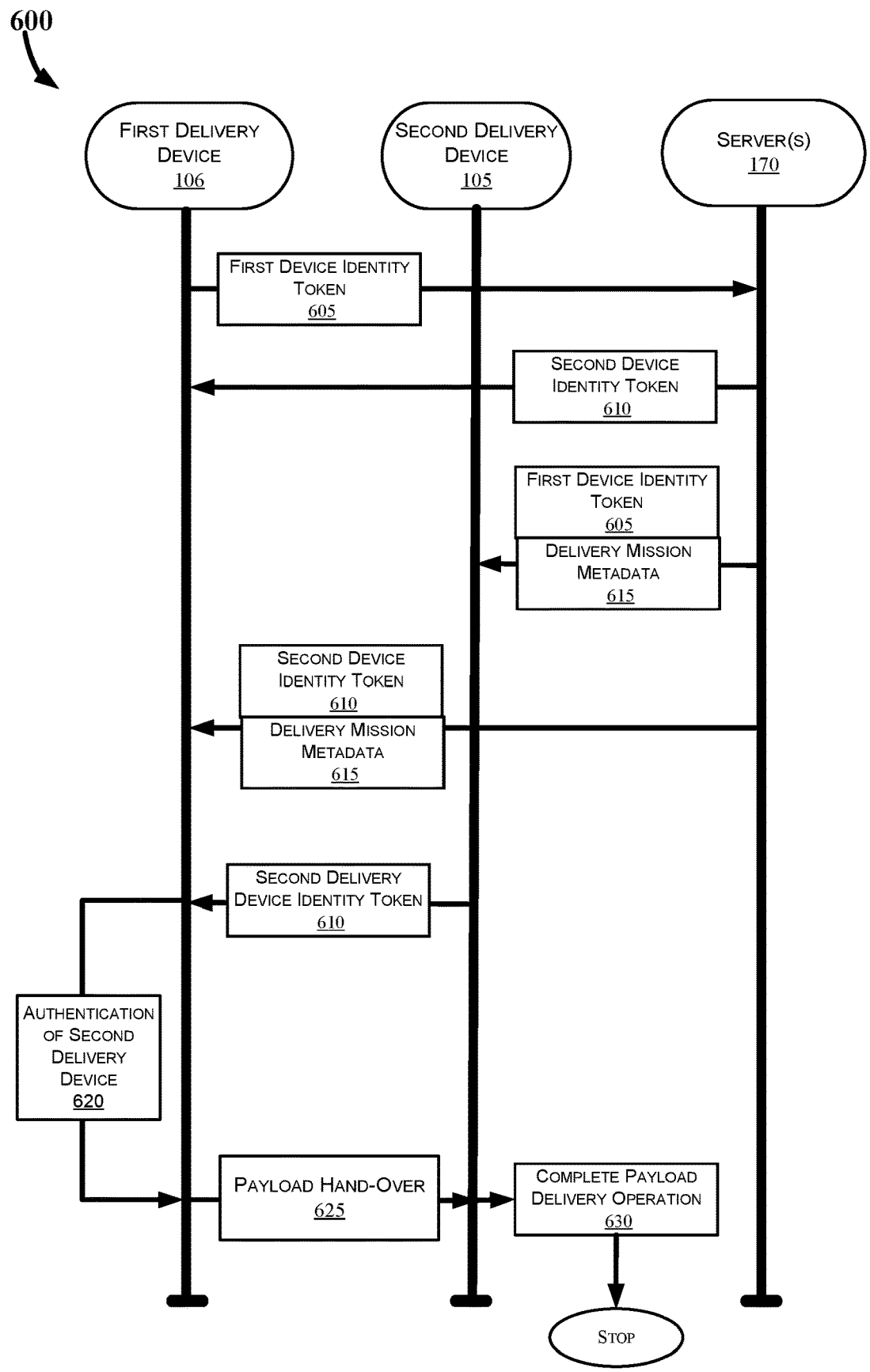
FIG. 6 depicts another functional flow diagram in accordance with an embodiment of the present disclosure.

FIGS. 4, 5, and 6 illustrate three embodiments for authenticating two delivery devices participating in a common delivery mission. FIG. 4 describes a first embodiment where the server(s) 171 generate the device identity tokens for respective devices, and delivery the identity tokens to the participating delivery devices. Each respective delivery device may receive an authenticating token that may be passed to a second delivery device, and the second delivery device may receive information in the delivery mission metadata that allows the receiving device to authenticate the sending device.

FIG. 5 illustrates an embodiment where each respective delivery device includes a token generator where the tokens are generated onboard the delivery device and pushed to the server(s) 170. The server(s) 170 may authenticate the respective sending devices, and distribute their generated token to second delivery device(s) that are scheduled to tender the cargo to the second delivery device.

FIG. 6 illustrates a third embodiment where delivery device identity tokens for all devices in a mission may be generated either in the cloud (e.g., via the server(s) 170) or locally using the device token generator 380 respectively included in the participating delivery device hardware of the payload delivery device (e.g., 355-365).

It should be appreciated that in all three embodiments described with respect to FIGS. 4-6, the delivery devices always validate device identity tokens received from a second delivery device using the cloud server(s) (e.g., the server(s) 170) prior to receiving or tendering the cargo 215.

Referring now to FIG. 4, a functional flow diagram 400 is depicted, in accordance with an embodiment of the present disclosure. The server(s) 170 may generate a first delivery device identity token 405, a second delivery device identity token 415, and delivery mission metadata 410. The server(s) 170 may pass the delivery device tokens 405 and 415 and the delivery mission metadata to some or all of the participating delivery devices. For example, the server(s) may send the first delivery device identity token 405 and the delivery mission metadata 410 to the first delivery device 106. The server(s) 170 may further send the second delivery device identity token 415 and the delivery mission metadata 410 to the second delivery device 105. As the second delivery device 105 approaches the first delivery device 106 to receive tender of the cargo, the second delivery device 410 may send the second delivery device identity token 415 to the first delivery device 106. Since the first delivery device 106 also received the delivery mission metadata 410, the first delivery device may be expecting to receive the second delivery device identity token 415, and may have a corresponding key to authenticate that device. At 420, the first delivery device 106 may authenticate the second delivery device 105, and responsive to the authentication, hand-over the payload to the second delivery device 105 at step 425. At step 430 the second delivery device may complete payload delivery operation, which may include tendering authenticating another device (not shown in FIG. 4), or performing the final delivery.

FIG. 5 is another functional flow diagram in accordance with an embodiment of the present disclosure. In FIG. 5, each respective delivery device 106 and 105 may be disposed with token generator(s), where the first delivery device 106 and/or the second delivery device 105 generates the device identity token onboard the respective delivery device and pushes the identity toke to the server(s) 170. The server(s) 170 may authenticate the respective sending devices, and distribute their generated token to second delivery device(s) that are scheduled to tender the cargo to the second delivery device.

The first delivery device 106 may generate a first delivery device identity token 505 and forward the token 505 to the server(s) 170. The second delivery device 105 may generate a second delivery device identity token 510 and pass the token to the server(s) 170. The server(s) 170 may authenticate the first delivery device identity token 505 and the second delivery device identity token 510, and generate the delivery mission metadata 515.

The server(s) 170 may pass the delivery device tokens 505 and 510, along with the mission metadata 515 to the second delivery device 105 and the delivery mission metadata the second delivery device 105. The server(s) may further send the first delivery device identity token 510 and the delivery mission metadata 515 to the first delivery device 106.

As the second delivery device 105 approaches the first delivery device 106 to receive tender of the cargo, the second delivery device 105 may send the second delivery device identity token 520 to the first delivery device 106. Since the first delivery device 106 also received the delivery mission metadata 515, the first delivery device 106 may be expecting to receive the second delivery device identity token 520, and may have a corresponding key to authenticate that device. At 530, the first delivery device 106 may authenticate the second delivery device 105, and responsive to the authentication, hand-over the payload to the second delivery device 105 at step 530. At step 535 the second delivery device 105 may complete payload delivery operation, which may include tendering authenticating another device (not shown in FIG. 5), or performing the final delivery.

FIG. 6 depicts another functional flow diagram in accordance with an embodiment. In the embodiment of FIG. 6, the delivery device identity tokens for all devices in a mission may be generated either in the cloud (e.g., via the server(s) 170) or locally using the device token generator 380 respectively included in the participating delivery device hardware of the payload delivery devices (e.g., onboard the first delivery device 106, the second delivery device 105, or via the server(s) 170).

The first delivery device 106 may generate a first delivery device identity token 605 and forward the token 505 to the server(s) 170. The server(s) 170 may generate a second delivery device identity token 610, and delivery mission metadata 615.

The server(s) 170 may pass the delivery device tokens 605 and 610, and the delivery mission metadata 615 to some or all of the participating delivery devices 105 and/or 106. For example, the server(s) 170 may send the first delivery device identity token 605 and the delivery mission metadata 615 to the second delivery device 105. The server(s) 170 may further send the second delivery device identity token 610 and the delivery mission metadata 615 to the first delivery device 106.

As the second delivery device 105 approaches the first delivery device 106 to receive tender of the cargo, the second delivery device 410 may send the second delivery device identity token 610 to the first delivery device 106. Since the first delivery device 106 also received the delivery mission metadata 615, the first delivery device may be expecting to receive the second delivery device identity token 610, and may have a corresponding key to authenticate that device.

At 620, the first delivery device 106 may authenticate the second delivery device 105, and responsive to the authentication, hand-over the payload to the second delivery device 105 at step 625. At step 630 the second delivery device may complete payload delivery operation, which may include tendering authenticating another device (not shown in FIG. 6), or performing the final delivery.

Figure 7:
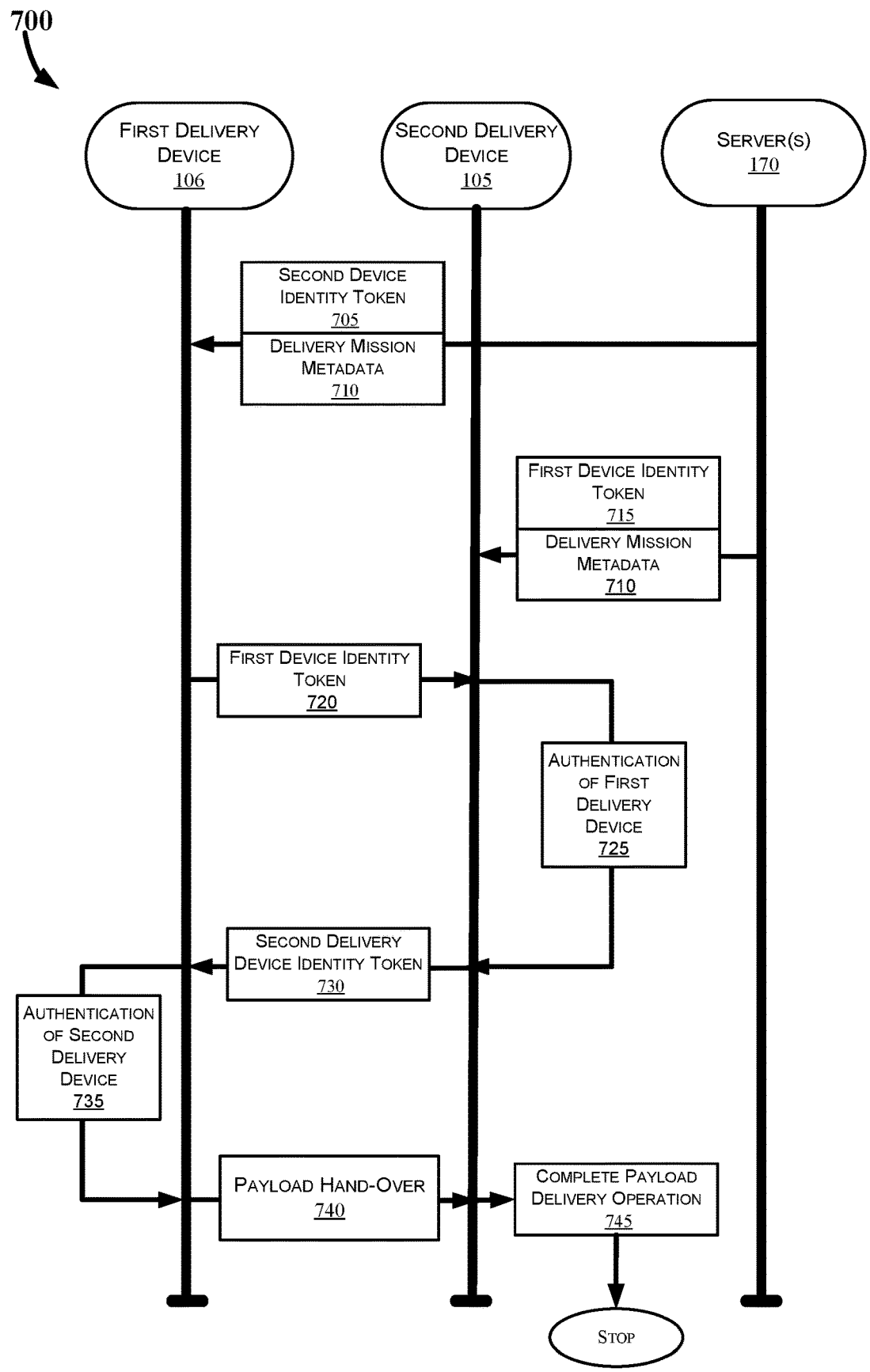
FIG. 7 depicts another functional flow diagram in accordance with an embodiment of the present disclosure.

FIG. 7 depicts another functional flow diagram in accordance with an embodiment. In the embodiment of FIG. 7, the delivery device identity tokens for all devices in a mission may be generated either in the cloud (e.g., via the server(s) 170) or locally using the device token generator 380 respectively included in the participating delivery device hardware of the payload delivery devices (e.g., onboard the first delivery device 106, the second delivery device 105, or via the server(s) 170). The example depicted in FIG. 7 illustrates an embodiment where the first device identity token 715 and the second device identity token 705 are received from the server(s) 170, then verified by the first delivery device 106 and the second delivery device 170, respectively. In an alternative embodiment, the first delivery device 106 may generate an identity token via a token generator onboard the first delivery device, and forward the identity toke to the server(s) 170 such that the server(s) act as a gatekeeper for the device identity tokens.

In another aspect, and as shown in FIG. 7, the server(s) 170 may generate the identity tokens and forward the tokens to the first and second delivery devices 106 and 105, respectively, prior to sending delivery mission metadata to the devices 106 and 105. In either scenario, the server(s) 170 may send delivery mission metadata 710 to the first delivery device 106 and the second delivery device 105, as shown in FIG. 7. The delivery devices may then authenticate each other by exchanging their device identity tokens (either generated onboard the respective device or received from the server(s) 170 as shown in FIG. 7.

The first delivery device 106 may generate (or receive from the server(s) 170) a first delivery device identity token 720 and forward the token 720 to the second delivery device 105.

The server(s) 170 may pass the first delivery device identity token 715 and the delivery mission metadata 710 to the second delivery device 105. The server(s) 170 may further send the second delivery device identity token 705 and the delivery mission metadata 710 to the first delivery device 106.

As the first delivery device 105 approaches the second delivery device 105 to tender the cargo, the first delivery device 106 may send the first delivery device identity token 720 to the second delivery device 105 for authentication. Since the second delivery device 105 also received the delivery mission metadata 710, the second delivery device 105 may be expecting to receive the first delivery device identity token 720, and may have a corresponding key to authenticate that device. The second delivery device 105 may authenticate the first delivery device 106 at step 725.

At step 730, the second delivery device 105 may send the second delivery device identity token 730 to the first delivery device 106, and the first delivery device 106 may authenticate the second delivery device 105 (step 735) in the same manner after receiving the second delivery device identity token 730. Responsive to the mutual authentication, the first delivery device 106 may hand over the payload at step 740. At step 745 the second delivery device may complete payload delivery operation, which may include tendering authenticating another device (not shown in FIG. 6), or performing the final delivery.

Figure 8:
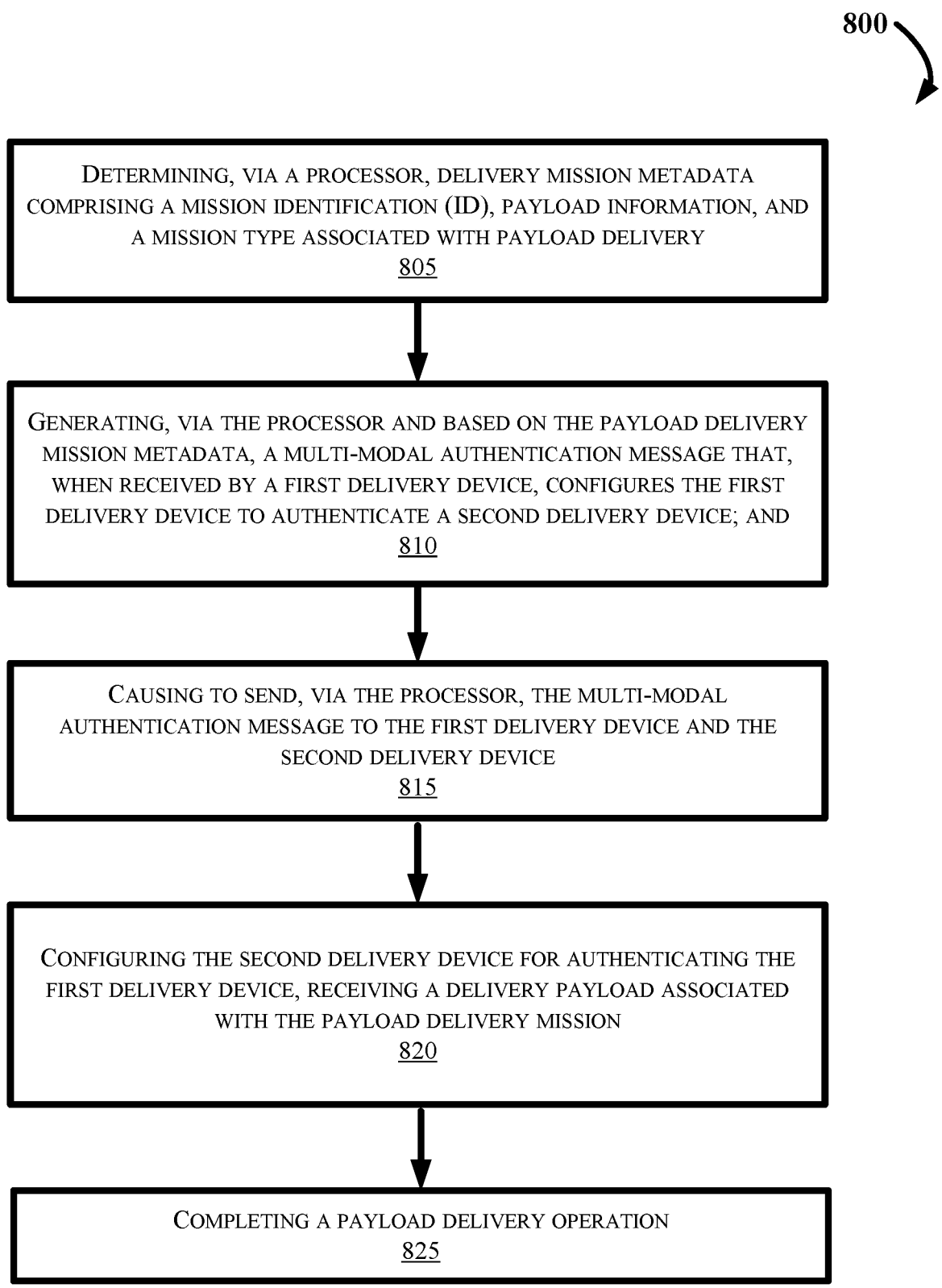
FIG. 8 depicts a flow diagram of an example method for controlling a robotic vehicle for package delivery in accordance with the present disclosure.

FIG. 8 depicts a flow diagram of an example method for controlling a robotic vehicle for package delivery in accordance with the present disclosure. At step 805, the method 800 may commence with determining, via a processor, delivery mission metadata comprising a mission identification (ID), payload information, and a mission type associated with payload delivery. Mission type data can indicate whether delivery cargo is a single package delivery, multiple package delivery, and/or indicate characteristics associated with the cargo to be delivered such as whether there are hazardous materials onboard, whether the cargo includes fragile materials, liquid, flammable materials, or other characteristics. In other aspects, certain some packages may require special handling (e.g., hazardous or fragile materials, which may be best handled in particular ways or be routed according to permitted route rules).

At step 810, the method 800 may include generating, via the processor and based on the payload delivery mission metadata, a multi-modal authentication message that, when received by a first delivery device, configures the first delivery device to authenticate a second delivery device. In some aspects, one or more of the first delivery device and the second delivery device is an autonomous robotic delivery vehicle.

This step may further include generating payload identification information that uniquely identifies a package to be delivered, generating payload transfer information that uniquely identifies the first delivery device ID associated with the delivery segment ID value, generating payload transfer information comprising the first delivery device ID and the second delivery device ID associated with the delivery segment ID value, and generating delivery segment information that localizes a delivery segment start location and a delivery segment end location.

Generating the delivery mission metadata associated with payload delivery can include generating a cargo ID value that uniquely identifies the payload associated with the payload delivery operation, generating a delivery segment ID value associated with a localization of a delivery segment, generating a delivery segment start location, generating a delivery segment end location, generating transport mode metadata, and generating device metadata. The delivery mission metadata further include a mission name.

In some aspects, the device metadata can include a unique device ID value, a unique device serial number, a first device type, and a first device health status.

The transport mode metadata can include one or more of a delivery segment ID value, a first delivery device ID, a second delivery device ID, a cargo ID indicative of cargo to be delivered, and final destination payload transmission information.

At step 815, the method 800 may further include causing to send, via the processor, the multi-modal authentication message to the first delivery device and the second delivery device. This step may include generating, via the processor, a first device identity token uniquely associated with the payload delivery mission metadata and a first delivery device, generating, via the processor, a second device identity token uniquely associated with the payload delivery mission metadata and a second delivery device, transmitting, via the processor, the first device identity token and the delivery mission metadata to the second delivery device, and transmitting, via the processor, the multi-modal authentication message comprising the second device identity token and the delivery mission metadata to the first delivery device. In some aspects, the multi-modal authentication message configures the first delivery device to authenticate the second delivery device responsive to receiving a second delivery device identity token received from the second delivery device.

In one example embodiment, the multi-modal authentication message configures the second delivery device to authenticate the first delivery device responsive to receiving a first delivery device identity token received from the first delivery device.

In another aspect of the present disclosure, step 815 may further include receiving via the processor and from a first delivery device, a first device identity token uniquely associated with a first delivery device, receiving, via the processor, a second device identity token uniquely associated with a second delivery device, and generating updated delivery mission metadata by associating with the first device identity token and the second device identity token to the delivery mission metadata.

In some aspects, generating the updated delivery mission metadata further defining a first device identity token expiration, and defining a second device identity token expiration. The updated delivery mission metadata and the multi-modal authentication message configures the first delivery device to authenticate the second delivery device responsive to receiving a second delivery device identity token received from the second delivery device before the second device identity token expiration.

This step may further include may further include causing to send, via the processor, the multi-modal authentication message to the first delivery device and the second delivery device. This step may include transmitting, via the processor, the multi-modal authentication message comprising the updated delivery mission metadata to first delivery device and the second delivery device. The multi-modal authentication message further configure the first delivery device to authenticate the second delivery device responsive to receiving a second delivery device identity token received from the second delivery device.

Transmitting the multi-modal authentication message may include sending the updated delivery mission metadata to first delivery device and the second delivery device. The multi-modal authentication message may configure the first delivery device to authenticate the second delivery device responsive to receiving a second delivery device identity token received from the second delivery device. Similarly, the multi-modal authentication message configures the second delivery device to authenticate the first delivery device responsive to receiving a first delivery device identity token received from the first delivery device.

In another aspect of the present disclosure, this step may include receiving via the processor and from a first delivery device, a first device identity token uniquely associated with a first delivery device, receiving, via the processor, a second device identity token uniquely associated with a second delivery device, and generating updated delivery mission metadata by associating with the first device identity token and the second device identity token to the delivery mission metadata.

In another aspect, the multi-modal authentication message configures the second delivery device to authenticate the first delivery device responsive to receiving a first delivery device identity token received from the first delivery device. Generating the updated delivery mission metadata can further include defining a first device identity token expiration, and defining a second device identity token expiration. The updated delivery mission metadata and the multi-modal authentication message configures the first delivery device to authenticate the second delivery device responsive to receiving a second delivery device identity token received from the second delivery device before the second device identity token expiration. The multi-modal authentication message may further configure the second delivery device to authenticate the first delivery device responsive to receiving a first delivery device identity token received from the first delivery device before the second device identity token expiration.

According to a third embodiment, the method according to claim 1, further including receiving via the processor and from a first delivery device or a token generator associated with the processor, a first device identity token uniquely associated with a first delivery device, receiving, via the processor from a second delivery device or the token generator associated with the processor, a second device identity token uniquely associated with a second delivery device, determining, that the first device identity token matches a token key, determining that the second device identity token matches the token key, generating updated delivery mission metadata by associating with the first device identity token and the second device identity token to the delivery mission metadata, and transmitting, via the processor, the multi-modal authentication message comprising the updated delivery mission metadata to first delivery device and the second delivery device.

The updated delivery mission metadata and the multi-modal authentication message configures the first delivery device to authenticate the second delivery device responsive to receiving a second delivery device identity token received from the second delivery device.

At step 825, the method 800 may further include completing a payload delivery operation.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for authenticating payload delivery devices via a distributed computing system comprising:
    determining, via a processor, delivery mission metadata comprising a mission identification (ID), payload information, a mission type associated with payload delivery, a delivery segment ID value associated with a localization of a delivery segment, a delivery segment start location, a delivery segment end location, transport mode metadata and device metadata, wherein the device metadata comprises a unique device ID value, a unique device serial number, a first device type, and a first device health status;
    generating, via the processor and based on the delivery mission metadata, a multi-modal authentication message that, when received by a first delivery device, configures the first delivery device to authenticate a second delivery device;
    causing to send, via the processor, the multi-modal authentication message to the first delivery device and the second delivery device,
    wherein the multi-modal authentication message configures the second delivery device for authenticating the first delivery device and receiving a delivery payload associated with the payload delivery;
    receiving via the processor and from the first delivery device, a first device identity token uniquely associated with the first delivery device;
    receiving, via the processor, a second device identity token uniquely associated with the second delivery device;
    generating updated delivery mission metadata by associating with the first device identity token and the second device identity token to the delivery mission metadata;
    transmitting, via the processor, the multi-modal authentication message comprising the updated delivery mission metadata to first delivery device and the second delivery device;
    causing to send, via the processor, a second multi-modal authentication message to the second delivery device and a third delivery device;
    providing the first and second delivery devices as ground-based vehicles,
    providing the third delivery device as an air-based delivery vehicle,
    providing for a ground-based transfer of cargo from the first delivery device to the second delivery device,
    transferring the cargo from the second delivery device to the third delivery device, and
    tendering the cargo from the third delivery device to a recipient,
    wherein the second multi-modal authentication message configures the third delivery device for authenticating the second delivery device, and receiving the delivery payload associated with the payload delivery from the second delivery device, wherein the second multi-modal authentication message includes second delivery mission metadata comprising a second device type of the third delivery device, wherein the second device type is different than the first device type, wherein the multi-modal authentication message configures the first delivery device to authenticate the second delivery device responsive to receiving the second delivery device identity token received from the second delivery device, wherein the first and second device identity tokens are each configured to expire after a predetermined amount of time corresponding to a duration of a first delivery mission during which the second delivery device has to receive the delivery payload from the first delivery device, wherein the delivery mission metadata further comprises an image of the first delivery device in order to allow for multi-factor authentication between the first and second delivery devices, wherein the first delivery device is either a bipedal or 4-legged robot, and wherein each of the first and second delivery devices are configured to authenticate each other and other delivery devices through artificial intelligence (AI)-based image recognition.

2. The method according to claim 1, wherein the multi-modal authentication message configures the second delivery device to authenticate the first delivery device responsive to receiving a first delivery device identity token received from the first delivery device.

3. The method according to claim 1, wherein generating the updated delivery mission metadata further comprises:
defining a first device identity token expiration; and
defining a second device identity token expiration;
wherein the updated delivery mission metadata and the multi-modal authentication message configures the first delivery device to authenticate the second delivery device responsive to receiving a second delivery device identity token received from the second delivery device before the second device identity token expiration.

4. The method according to claim 3, wherein the multi-modal authentication message configures the second delivery device to authenticate the first delivery device responsive to receiving a first delivery device identity token received from the first delivery device before the second device identity token expiration.

5. The method according to claim 1, further comprising:
receiving via the processor and from a first delivery device or a token generator associated with the processor, a first device identity token uniquely associated with a first delivery device;
receiving, via the processor from a second delivery device or the token generator associated with the processor, a second device identity token uniquely associated with a second delivery device;
determining, that the first device identity token matches a token key;
determining that the second device identity token matches the token key;
generating updated delivery mission metadata by associating with the first device identity token and the second device identity token to the delivery mission metadata; and
transmitting, via the processor, the multi-modal authentication message comprising the updated delivery mission metadata to first delivery device and the second delivery device;
wherein the updated delivery mission metadata and the multi-modal authentication message configures the first delivery device to authenticate the second delivery device responsive to receiving a second delivery device identity token received from the second delivery device.

6. The method according to claim 1, wherein the transport mode metadata comprises one or more of:
a delivery segment ID value;
a first delivery device ID;
a second delivery device ID;
a cargo ID indicative of the cargo to be delivered; and
final destination payload transmission information.

7. The method according to claim 6, wherein generating the delivery mission metadata comprises:
generating payload identification information that uniquely identifies a package to be delivered;
generating payload transfer information that uniquely identifies the first delivery device ID associated with the delivery segment ID value;
generating payload transfer information comprising the first delivery device ID and the second delivery device ID associated with the delivery segment ID value; and
generating delivery segment information that localizes a delivery segment start location and a delivery segment end location.

8. The method according to claim 1, wherein the delivery mission metadata further comprises a mission name.

9. A multi-modal delivery system, comprising:
a processor; and
a memory for storing executable instructions, the processor programmed to execute the instructions to:
determine delivery mission metadata comprising a mission identification (ID), payload information, and a mission type associated with payload delivery, a delivery segment ID value associated with a localization of a delivery segment, a delivery segment start location, a delivery segment end location, transport mode metadata and device metadata, wherein the device metadata comprises a unique device ID value, a unique device serial number, a first device type, and a first device health status;
generate, based on the delivery mission metadata, a multi-modal authentication message that, when received by a first delivery device, configures the first delivery device to authenticate a second delivery device;
cause to send the multi-modal authentication message to the first delivery device and the second delivery device, wherein the multi-modal authentication message configures the second delivery device for authenticating the first delivery device and receiving a delivery payload associated with the payload delivery;
receive, via the processor and from the first delivery device, a first device identity token uniquely associated with the first delivery device;
receive, via the processor, a second device identity token uniquely associated with the second delivery device;
generate updated delivery mission metadata by associating with the first device identity token and the second device identity token to the delivery mission metadata;
transmit, via the processor, the multi-modal authentication message comprising the updated delivery mission metadata to first delivery device and the second delivery device; and
cause to send, via the processor, a second multi-modal authentication message to the second delivery device and a third delivery device,
wherein the second multi-modal authentication message configures the third delivery device for authenticating the second delivery device, and receiving the delivery payload associated with the payload delivery from the second delivery device, wherein the second multi-modal authentication message includes second delivery mission metadata comprising a second device type of the third delivery device, wherein the second device type is different than the first device type,
wherein the first and second delivery devices are ground-based vehicles, wherein the third delivery device is an air-based delivery vehicle, wherein the first delivery device is configured to provide for a ground-based transfer of cargo from the first delivery device to the second delivery device, wherein the second delivery device is configured to transfer the cargo from the second delivery device to the third delivery device, and wherein the third delivery device is configured to tender the cargo from the third delivery device to a recipient, wherein the multi-modal authentication message configures the first delivery device to authenticate the second delivery device responsive to receiving the second delivery device identity token received from the second delivery device, wherein the first and second device identity tokens are each configured to expire after a predetermined amount of time corresponding to a duration of a first delivery mission during which the second delivery device has to receive the delivery payload from the first delivery device, wherein the delivery mission metadata further comprises an image of the first delivery device in order to allow for multi-factor authentication between the first and second delivery devices, wherein the first delivery device is either a bipedal or 4-legged robot, and wherein each of the first and second delivery devices are configured to authenticate each other and other delivery devices through artificial intelligence (AI)-based image recognition.

10. The system according to claim 9, wherein the multi-modal authentication message configures the second delivery device to authenticate the first delivery device responsive to receiving a first delivery device identity token received from the first delivery device.

11. A non-transitory computer-readable storage medium in a distributed computing system, the computer-readable storage medium having instructions stored thereupon which, when executed by a processor, cause the processor to:
determine payload delivery mission metadata comprising a mission identification (ID), payload information, and a mission type associated with payload delivery, a delivery segment ID value associated with a localization of a delivery segment, a delivery segment start location, a delivery segment end location, transport mode metadata and device metadata, wherein the device metadata comprises a unique device ID value, a unique device serial number, a first device type, and a first device health status;
generate, based on the payload delivery mission metadata, a multi-modal authentication message that, when received by a first delivery device, configures the first delivery device to authenticate a second delivery device;
cause to send the multi-modal authentication message to the first delivery device and the second delivery device,
wherein the multi-modal authentication message configures the second delivery device for authenticating the first delivery device and receiving a delivery payload associated with the payload delivery;
receive, via the processor and from the first delivery device, a first device identity token uniquely associated with the first delivery device;
receive, via the processor, a second device identity token uniquely associated with the second delivery device;
generate updated delivery mission metadata by associating with the first device identity token and the second device identity token to the delivery mission metadata;
transmit, via the processor, the multi-modal authentication message comprising the updated delivery mission metadata to first delivery device and the second delivery device; and
cause to send, via the processor, a second multi-modal authentication message to the second delivery device and a third delivery device,
wherein the second multi-modal authentication message configures the third delivery device for authenticating the second delivery device, and receiving the delivery payload associated with the payload delivery from the second delivery device, wherein the second multi-modal authentication message includes second delivery mission metadata comprising a second device type of the third delivery device, wherein the second device type is different than the first device type, wherein the multi-modal authentication message configures the first delivery device to authenticate the second delivery device responsive to receiving the second delivery device identity token received from the second delivery device, wherein the first and second device identity tokens are each configured to expire after a predetermined amount of time corresponding to a duration of a first delivery mission during which the second delivery device has to receive the delivery payload from the first delivery device, wherein the delivery mission metadata further comprises an image of the first delivery device in order to allow for multi-factor authentication between the first and second delivery devices, wherein the first delivery device is either a bipedal or 4-legged robot, and wherein each of the first and second delivery devices are configured to authenticate each other and other delivery devices through artificial intelligence (AI)-based image recognition.

* * * * *